Jan. 10, 1939.　　　M. C. SPENCER　　　2,143,215
ADJUSTABLE SPEED POLYPHASE MOTOR
Filed Feb. 19, 1937
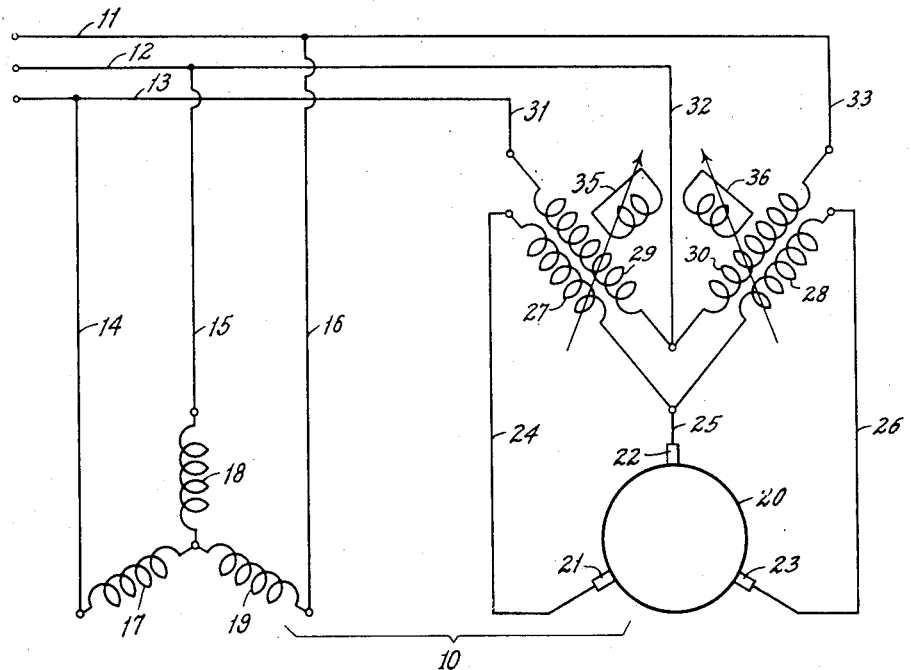
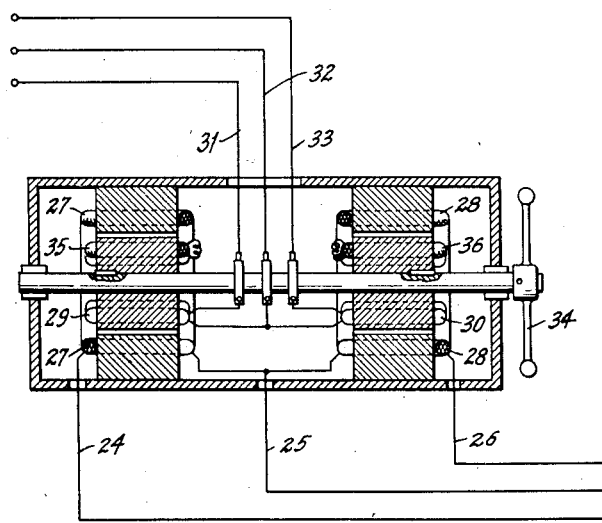
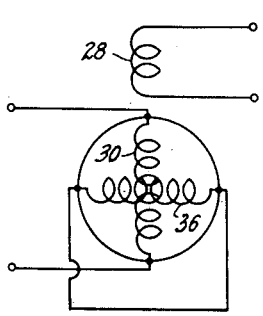
INVENTOR.
Millard Cole Spencer
BY
Wm. J. Herdman
ATTORNEY.

Patented Jan. 10, 1939

2,143,215

UNITED STATES PATENT OFFICE 2,143,215

ADJUSTABLE SPEED POLYPHASE MOTOR

Millard Cole Spencer, East Orange, N. J.

Application February 19, 1937, Serial No. 126,532

6 Claims. (Cl. 172—274)

My invention relates to alternating current motors and pertains in particular to polyphase alternating current motors.

Hitherto, numerous attempts have been made to provide an effective and efficient adjustable speed, polyphase, alternating current motor having characteristics similar to a direct current shunt motor, but such motors have, up to the present time, been necessarily large, complicated and expensive for their output. Perhaps the best known motor of this type is that known as the Winter-Eichberg. This motor has a three phase stator winding of the usual type and a rotor winding connected to a commutator. The rotor is provided with three equally spaced brushes per pair of poles. The speed of the motor depends upon the three phase electromotive force applied to the commutator brushes. This electromotive force is provided by the use of a three phase transformer with primary and secondary windings, the primary windings being connected to the same three phase source of power as the stator windings of the motor. The secondary windings are provided with taps and switching arrangements by which predetermined three phase electromotive forces may be applied in steps to the motor brushes. In order that such motor may commutate satisfactorily, it is necessary to design the rotor for low electromotive forces. This requires that the transformer secondary windings, taps and switches must handle relatively heavy currents at low voltages resulting in large, bulky and expensive equipment and, furthermore, the number of speeds available is limited to a practical number of transformer taps and switch points.

I have discovered that the above mentioned difficulties and limitations can be entirely overcome and the motor speed adjustment made wholly continuous over a wide speed range below, through and above synchronous speed by using two induction type voltage regulators connected in open delta between the source of polyphase current and the brushes of the motor for obtaining an adjustable polyphase electromotive force to apply to the motor commutator brushes.

One of the principal objects of my invention comprises producing a polyphase alternating current motor having direct current shunt motor characteristics and in which the speed adjustment is wholly continuous over a wide speed range below, through and above synchronous speed.

Another object comprises producing a polyphase alternating current shunt motor in which the speed may be adjusted without breaking the circuit and in which rheostat losses at any speed setting are eliminated.

A further object comprises producing a polyphase variable speed shunt motor in which the power factor of the motor may be adjusted over a wide range.

A still further object comprises producing a polyphase alternating current shunt motor in which the commutation is effective and efficient and the torque constant over the entire range of speed from zero up to more than fifty percent above synchronous speed.

I accomplish all of the above noted desirable results by means of the novel structure, combination and inter-relation of circuits and apparatus which will be specifically described hereinafter with reference to the accompanying drawing forming a part of this specification and in which like reference numerals designate corresponding parts throughout.

In the drawing:

Fig. 1 is a diagrammatic representation of an embodiment of my invention as exemplified by a two-pole three phase alternating current shunt motor;

Fig. 2 is a longitudinal section through the speed regulator shown diagrammatically in Fig. 1; and Fig. 3 is a diagrammatic representation of the circuit connections of one of the inductor regulators of the speed regulator.

Referring now particularly to Figs. 1 and 2 in which I have shown my invention as embodied in a three phase, two pole, alternating current shunt motor, merely by way of example; the motor indicated generally at 10 comprises a stator carrying the polyphase windings 17, 18 and 19 connected as shown in star and through leads 14, 15 and 16 with conductors 13, 12 and 11, respectively, which may be considered as connected to a source of three phase current. A rotor 20 provided with a commutator carries a rotor winding connected as usual to the commutator and the commutator is provided with three equally spaced brushes 21, 22 and 23. The three brushes 21, 22 and 23 are connected by leads 24, 25 and 26, respectively, through the secondary windings 27 and 28 of two single phase induction type regulators which have primary windings 29 and 30 connected to the three phase source of power through conductors 31, 32, 33 and 13, 12 and 11, respectively. Three single phase induction type regulators may be used, but I have found that two regulators connected, as shown, in open delta provide a sufficiently good balance between the currents in the different phases for all practical purposes and thus simplifies and cheapens the equipment.

The two induction type regulators may conveniently be placed in one frame as shown in Fig. 2 with the two rotors keyed as shown to a common shaft. The low voltage high current secondary windings 27 and 28 are placed on the stators of the regulators and the high voltage low current primary windings 29 and 30 on the rotors. The energizing currents may be conducted into the primary windings on the rotor through slip rings, as shown, or flexible leads. The relative positions of the cooperating stator and rotor coils of the regulators may be simultaneously adjusted by means of the hand wheel 34 attached to the common shaft.

When the axes of the primary coils 29 and 30 coincide with the axes of the secondary coils 27 and 28 respectively, as indicated in Fig. 3, which illustrates diagrammatically one of the induction regulators, the electromotive force induced in the secondary coils by transformer action from the primary coils will be at maximum. When the rotor is turned so the axes of the primary coils are at right angles to the axes of the secondary coils, no electromotive force is induced in the secondary coils. If now the rotors are turned still further so that the axes of the primary coils coincide with the axes of the secondary coils in the opposite direction, a maximum electromotive force will be again induced in the secondary coils but it will have a reversed relative polarity with respect to the primary electromotive force. By turning the rotors through an angle of 180 degrees, the electromotive force induced in the secondary windings may be changed from a maximum in one direction through zero to a maximum in the opposite direction. Thus by placing the two regulator stators in the same frame and the two rotors on the same shaft and connecting the windings in open delta, I have found that it is possible to obtain a substantially balanced three phase electromotive force which can be varied from a maximum in one direction through zero to a maximum in the other direction to vary the speed of the motor, below, through and above synchronous speed.

In order to reduce the inductance of the secondary windings of the induction regulators, when the axes of the primary coils are at right angles to the axes of the secondary coils, other independent windings 35 and 36 are placed on the rotors, as shown in Figs. 1 and 3, in electrical space quadrature to the primary windings 29 and 30, respectively. Each of the windings 35 and 36 is short circuited on itself. A current is induced in these windings depending upon the electrical space-phase difference between them and the secondary windings 27 and 28, respectively, which reduces the self-inductance of these secondary windings.

The construction of the motor is relatively simple. The stator core is laminated and is provided with a winding similar to a three phase induction motor. The stator winding is connected directly to the source of power and requires no adjustment. The rotor core is the same as that of a slip ring induction motor, but the rotor winding, instead of being connected to slip rings, is connected to a commutator similar to a direct current motor armature. Three brush studs equally spaced are provided per pair of poles.

While the operating characteristics of this motor are quite similar to those of a direct current shunt motor, its method of operation is very different. When the stator winding of the motor is connected to a three phase line, a magnetic field is set up which revolves at synchronous speed. With the rotor standing still, this revolving magnetic field generates in the rotor and there appears at the brushes, a three phase electromotive force at line frequency, the magnitude of which depends upon the number of turns in the rotor winding. If the brushes are short-circuited a large current will flow in the rotor circuit and the motor will quickly come up to a speed just below synchronous speed and continue to run as an induction motor. If, however, a three phase electromotive force is applied to the brushes through the induction regulator shown in Fig. 2 having the same frequency and equal and opposite to the electromotive force generated in the rotor by the revolving magnetic field, the rotor will not revolve as no current will flow in the rotor. If now such bucking electromotive force applied to the rotor is reduced slightly by means of the induction regulator, a current will flow in the rotor and it will start to rotate. As the rotor revolves the magnitude and frequency of the electromotive force generated in it by the revolving magnetic field will be reduced. The motor will come up to such a speed that the difference between the electromotive force generated in it and the bucking electromotive force applied to it will be just sufficient to cause the necessary current to flow in the motor to carry the motor load. By thus adjusting the bucking electromotive force by means of the induction regulator, it is evident that the motor can be caused to run at any speed from standstill up to a speed slightly below synchronous speed. If, instead of applying a bucking electromotive force, an electromotive force in the same direction as the electromotive force generated in the load by the magnetic field is applied by adjustment of the regulator when the rotor is rotating below synchronous speed, the rotor may be caused to run up through synchronous speed to still higher speeds. I have found that it is quite practical to operate motors built in accordance with my invention at speeds of 50% or even 100% above synchronous speed.

It has been observed from operating models of motors, constructed in accordance with my invention and successfully demonstrated, that the motor operates at constant field and therefore develops constant torque over its entire speed range; that there are no rheostat losses at any speed setting; therefore, the efficiency of the motor is relatively high over the entire speed range; that the motor draws a balanced three phase load from a three phase system.

I have further found that the power factor of the motor depends upon the position of the brushes and may be made quite high or even leading by suitably adjusting the brushes with relation to the motor stator winding. It has been further found that the commutation of the motor is effective and efficient over the entire range of speed from zero up to more than 50% above synchronous speed.

It has further been observed that the motor speed regulation is wholly continuous from standstill through synchronous to over 50% above synchronous speed. It is possible to obtain any speed whatever within the range of the regulator.

The motor may be started by setting the regulator to minimum speed position and energizing the stator and regulator windings. Then by rotating handle 34 the motor may be brought from standstill to any desired speed or the stator and regulator windings energized to cause the motor to immediately start at such predetermined speed. In this way a wide variety of starting torques may be obtained. Normal starting torque can be obtained with a starting current only slightly higher than the normal operating current.

While I have shown and described, by way of example, only one embodiment of my invention, it will be apparent that various changes may be made therein without departing from the intended scope and spirit of the invention. I do not, therefore, desire to limit myself to the foregoing except as may be pointed out in the appended claims in which I claim:

1. An adjustable speed polyphase motor comprising a stator, a rotor, a winding on said stator, a commutator for said rotor, brushes for said commutator, a winding on said rotor connected to said commutator, a source of polyphase current for energizing said windings, said stator winding being connected to said source, at least two single phase induction type voltage regulators having stationary electromagnetic fields the primary windings of which are serially interconnected and connected to said source of polyphase current, the secondary windings of said regulators being likewise serially interconnected and connected to said brushes the primary and secondary windings of each of said regulators being electrically associated solely by electromagnetic induction and being otherwise electrically insulated from each other, and means for simultaneously changing the inductive relationship of the primary and secondary windings of both of said regulators to vary the electromotive force impressed on said brushes to adjust the speed of said motor.

2. An adjustable speed polyphase motor comprising a stator, a rotor, a polyphose winding on said stator, a commutator for said rotor, brushes for said commutator, a winding on said rotor connected to said commutator, a source of polyphase current for energizing said windings, said stator winding being connected to said polyphase source, a pair of single phase induction type voltage regulators, the primary windings of which are interconnected and connected in open delta to said source of polyphase current, the secondary windings of said regulators being likewise interconnected and connected in open delta to said brushes, said primary and secondary windings of each of said regulators being electrically associated solely by electromagnetic induction and being otherwise electrically insulated from each other and means for simultaneously changing the inductive relation of the primaries and secondaries of both of said regulators to vary the electromotive force impressed on said brushes to adjust the speed of said motor.

3. An adjustable speed polyphase motor comprising a stator, a rotor, a polyphase winding on said stator, a commutator for said rotor, brushes for said commutator, a winding on said rotor connected to said commutator, a source of polyphase current for energizing said windings, said stator windings being connected to said polyphase source, two single phase induction type voltage regulators, each comprising a rotor and a stator, a common shaft for said rotors, a common frame for said stators, secondary windings carried by said stators, primary windings carried by said rotors, said primary windings being interconnected and connected in open delta to said source of polyphase current, said secondary windings being likewise interconnected and connected in open delta to said brushes and means for rotating said common shaft to vary the inductive relation between said stators and rotors of both of said regulators to adjust the electromotive force applied to said motor brushes to effect continuous speed adjustment of said motor below, through and above synchronous speed.

4. An adjustable speed polyphase shunt motor comprising a stator, a rotor, a polyphase winding on said stator, a commutator for said rotor, brushes for said commutator, said brushes being adjustable with respect to said stator winding whereby the power factor of the motor may be adjusted over a wide range, a winding on said rotor connected to said commutator, a source of polyphase current for energizing said windings, said stator winding being connected to said polyphase source, a pair of single phase induction type voltage regulators, the primary windings of which are interconnected and connected in open delta to said source of polyphase current, the secondary windings of said regulator being likewise interconnected and connected in open delta to said brushes, said primary and secondary windings of each of said regulators being electrically associated solely by electromagnetic induction and being otherwise electrically insulated from each other and means for simultaneously changing the inductive relation of the primaries and secondaries of both of said regulators to vary the electromotive force impressed on said brushes to adjust the speed of said motor through wide limits both above and below synchronous speed.

5. An adjustable speed polyphase motor comprising, a stator, a rotor, a polyphase winding on said stator, a commutator for said rotor, brushes for said commutator, a winding on said rotor connected to said commutator, a source of polyphase current for energizing said windings, said stator windings being connected to said polyphase source, two single phase induction type regulators each comprising a rotor and a stator, a common shaft for said rotors, a common frame for said stators, secondary windings carried by said stators, two independent primary windings carried by each of said rotors, one of said primary windings being short-circuited and located with the axis thereof 90 electrical degrees to the axis of the other primary winding whereby the inductance of the secondary winding associated therewith is reduced when the axis of the other primary winding on the regulator rotor is at right angles to its associated secondary winding, said non-short-circuited primary windings being interconnected and connected in open delta to said source of polyphase current, said secondary windings being likewise interconnected and connected in open delta to said brushes and means for rotating said common shaft to simultaneously vary the inductive relation between said stators and rotors of both of said regulators to adjust the electromotive force applied to said motor brushes to adjust the speed of said motor through wide limits both above and below synchronous speed.

6. An adjustable speed polyphase motor system comprising a stator, a winding therefor, a rotor, a winding therefor, a source of polyphase current for energizing said windings, said stator winding being connected to said polyphase source, a polyphase voltage regulator comprising, at least two stators having windings thereon mounted on a common frame, a rotor and winding therefor associated with each of said stators respectively and mounted on a common shaft, each of said stator and rotor windings thereof being associated electrically solely by electromagnetic induction and being otherwise insulated from each other, said voltage regulator being connected in open delta to said polyphase source and said motor rotor winding whereby the electromotive force applied to said motor rotor winding may be widely varied to adjust the speed of said motor through wide limits both above and below synchronous speed.

MILLARD COLE SPENCER.